June 26, 1951 A. J. BUSCH ET AL 2,558,537
MAKE BUSY ARRANGEMENT HAVING GAS FILLED
TUBE RESPONSIVE ONLY TO HIGH-VOLTAGES
Filed Nov. 28, 1947
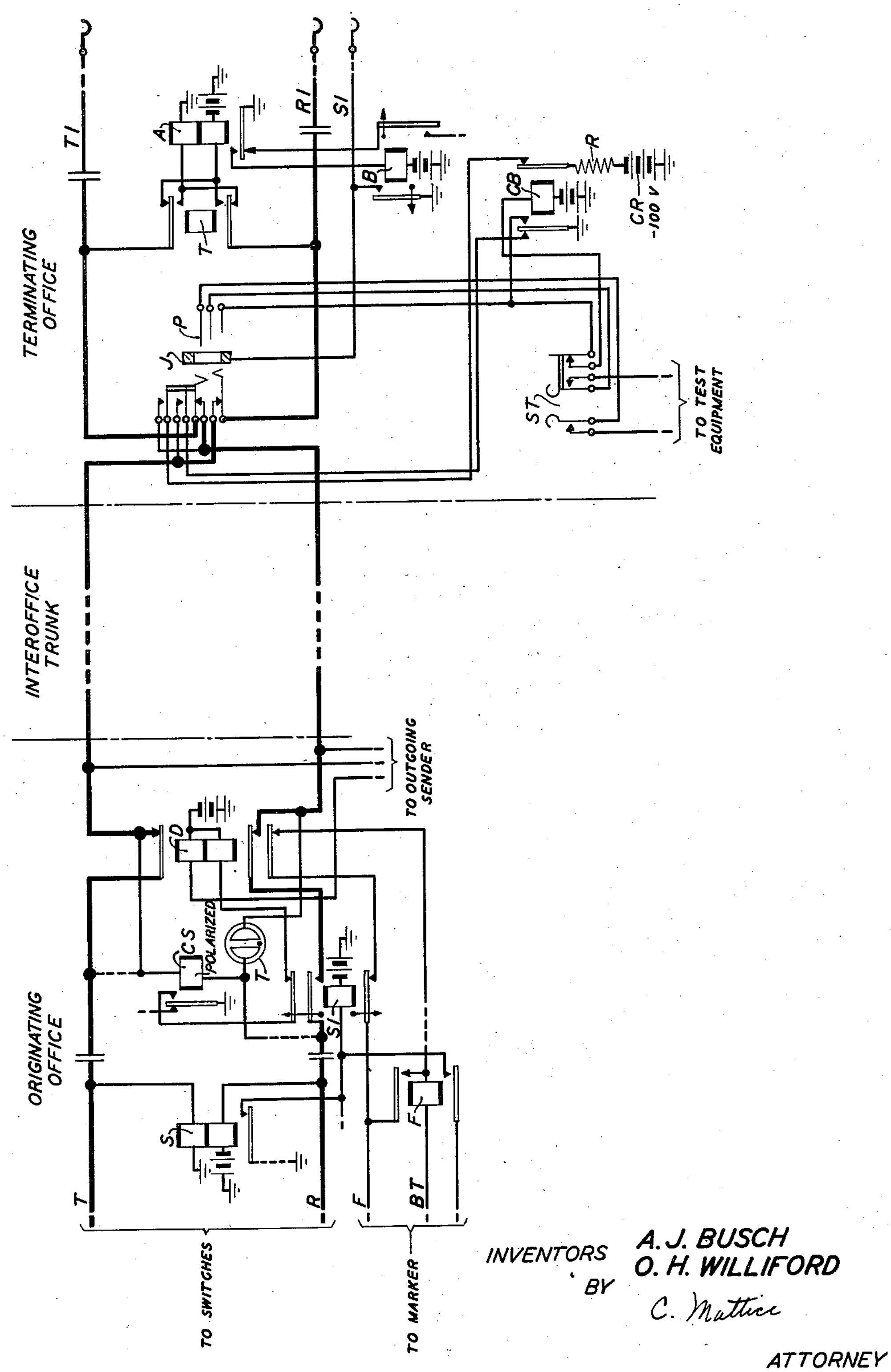
INVENTORS A. J. BUSCH
O. H. WILLIFORD
BY C. Mattice
ATTORNEY Patented June 26, 1951 2,558,537

UNITED STATES PATENT OFFICE 2,558,537

MAKE BUSY ARRANGEMENT HAVING GAS-FILLED TUBE RESPONSIVE ONLY TO HIGH VOLTAGES

Aloysius J. Busch, Madison, N. J., and Oscar H. Williford, Bronxville, N. Y., assignors to Bell Telephone Laboratories, Incorporated, New York, N. Y., a corporation of New York Application November 28, 1947, Serial No. 788,482

3 Claims. (Cl. 179—175.2)

This invention relates to telephone systems and more particularly to means employed for maintaining such systems in operative condition.

It has long been the practice to submit the circuits in which trunks interconnecting telephone offices terminate to periodic tests to determine that they are in satisfactory working condition. It is, of course, necessary that the associated trunks, when being tested, shall be marked busy at the end remote from the test to prevent their selection in an attempt to complete a service connection.

Heretofore it has been necessary to have a maintenance man apply the busy condition manually, which is a simple matter when the distant office is attended. However, with the increase in use of unattended offices, the dispatch of an attendant to the unattended office is often inconvenient. It has also been proposed to use one of a group of trunks as a means for controlling means for marking the group of trunks busy, but this is not always desirable.

In accordance with the present invention means is provided, operable over the talking conductors of the trunk incoming to the equipment to be tested, for marking the trunk busy at its distant end.

More specifically, an auxiliary circuit is provided for the supervisory relay at the distant end of the trunk, this circuit including a gas-filled tube which is unresponsive to the regular talking and signaling current but is responsive to a high voltage signal applied at the testing end of the trunk. The supervisory relay when operated, with the trunk otherwise idle, marks the trunk busy at that end.

In addition, means is provided to prevent the transmission of the high voltage signal when the trunk is in use in a service connection.

These and other features of the invention will be more clearly understood from a consideration of the following description in connection with the drawing which shows an inter-office trunk with parts of the circuits in the two offices.

When the trunk is to be used in a service connection the marker in the originating office, which is assumed to be of the cross bar type, tests the trunk to determine its busy or idle condition by connecting high resistance battery to conductor BT and ground to conductor F. If relays S1 and D are not operated and the circuit is otherwise complete, the marker considers the trunk idle, lowers the resistance in the BT lead so that relay F operates, locking to ground on conductor F. When the marker has established the connection from the calling subscriber's line to the incoming end of the trunk and is ready to release, it operates relay S1. Relay S operates under the control of the calling line and holds relay S1 operated throughout the call. Relay S1 closes a link in the connection between the outgoing supervisory relay CS and the trunk conductors. However, relay D is operated under the control of the outgoing sender, to prevent the premature operation of relay CS while the sender is transmitting information to the terminating office. When the sender has completed its functions, relay D releases and relay CS is connected over the front contact of relay S1 and the back contacts of relay D to the trunk conductors. However, relay CS does not operate since it is so polarized as to be unresponsive to the normal direction of current flow over the trunk.

At the terminating office relay A, which is associated with a selector of any well-known type, for example, a step-by-step selector, is operated, first over a bridge closed in the outgoing sender and then over the bridge in the trunk in the originating office. Relay A in operating, closes an obvious circuit for relay B which operates, connecting ground to conductor S1 to provide a holding circuit for the various relays of the trunk circuit and the switches at the terminating office.

When the connection is extended to the called subscriber and that subscriber answers, reversing relay T is operated in the well-known manner to reverse the connection of battery and ground to the incoming trunk conductors. The current flow over the trunk is now in the direction to cause relay CS to operate.

When it is desired to perform a test on the trunk circuit at the terminating office, ground connected to the sleeve of jack J affords an indication that the trunk circuit is busy. When the trunk is released, the insertion of plug P, which is associated with the test equipment which may be of the type disclosed in Patent 1,582,948 granted to J. N. Walters et al., May 4, 1926, into jack J disconnects the tip and ring conductors of the trunk from those of the trunk circuit. The tip and ring conductors of the trunk circuit are extended over contacts of jack J and plug P to contacts of key ST by which they may be extended to the test equipment.

The tip and ring conductors of the interoffice trunk are extended over auxiliary contacts on jack J to ground and battery CR at the back contacts of relay CB. This battery CR has a value of at least one hundred volts and may preferably be supplied from the same source as that used for coin return.

At the originating office a bridge is provided between the trunk conductors extending from the tip conductor through the winding of the supervisory relay CS and the gas-filled tube or diode T to the ring conductor. The tube T will not break down in response to the normal supervisory voltage but does break down when the 100-volt coin collect current is connected to the trunk conductors as above described. The direction of current flow through relay CS is in the operate direction and CS operates. The strength of this current is controlled by resistance R at the terminating office. Since the trunk circuit at the originating office was idle when relay CS operated, relay S1 is released and relay CS closes a circuit from ground at its front contact, over the upper back contact of relay S1, lower winding of relay D to battery. Relay D operates in this circuit, opening the operating circuit of relay F and thereby marking the trunk as busy to the marker.

When the plug P is withdrawn from jack J, the tube T is extinguished, relays CS and D release, the circuit of relay F is again closed at the lower back contact of relay D, and the trunk again becomes available for service.

Means is provided to guard against causing a false operation of the supervisory relay if the test plug is inadvertently inserted in the jack of a trunk occupied by a service connection. If the trunk is in use, the sleeve of jack J will be grounded as above described. Therefore, if plug P is inserted in jack J of a busy trunk, a circuit will be closed from ground at the contact of relay B, sleeve of jack J, sleeve of plug P, normal contact of key ST to the winding of relay CB and battery. Relay CB operates, immediately disconnecting battery CR and ground from the contacts of jack J and preventing the connection of the high potential to the trunk conductors Relay CB also locks to ground at its front contact over the normal contact of key ST.

What is claimed is:

1. In a telephone system, two telephone offices, a trunk circuit including a pair of talking conductors connecting said offices, and seizable at one of said offices when idle, a supervisory relay individual to said trunk circuit at said one office, means responsive to the seizure of said trunk circuit to prepare a circuit for said supervisory relay, switching equipment at the other of said offices operable over said talking conductors, means in said switching equipment for normally completing the circuit of said supervisory testing means at said other office, means for disconnecting said switching equipment from said talking conductors and connecting it with said testing means, auxiliary means comprising a gas-filled tube at said one office for operating said supervisory relay, means responsive to said connection of testing means with said switching equipment for connecting a high potential to said talking conductors to operate said gas-filled tube and said supervisory relay and means under the control of said supervisory relay for marking said trunk circuit busy.

2. In a telephone system, two telephone offices, a trunk circuit including a pair of talking conductors connecting said offices, and seizable at one of said offices when idle, a supervisory relay individual to said trunk circuit at said one office, contacts at said one office closed responsive to the seizure of said trunk circuit to connect said supervisory relay to said talking conductors, switching equipment at the other of said offices operable over said talking conductors, means in said switching equipment for normally completing the circuit of said supervisory relay, testing means at said other office, means for disconnecting said switching equipment from said talking conductors and connecting it with said testing means, auxiliary means for operating said supervisory relay comprising a diode connected in parallel with said contacts, means responsive to said connection of testing means with said switching equipment for connecting a high potential to said talking conductors to operate said diode and said supervisory relay and means under the control of said supervisory relay for marking said trunk circuit busy.

3. In a telephone system, two telephone offices, a trunk circuit including a pair of talking conductors connecting said offices, and seizable at one of said offices when idle, a supervisory relay individual to said trunk circuit at said one office, means responsive to the seizure of said trunk circuit to prepare a circuit for said supervisory relay, switching equipment at the other of said offices operable over said talking conductors, means in said switching equipment for normally completing the circuit of said supervisory relay, testing means at said other office, means for disconnecting said switching equipment from said talking conductors and connecting it with said testing means, auxiliary means comprising a gas-filled tube at said one office for operating said supervisory relay, means responsive to said connection of testing means with said switching equipment for connecting a high potential to said talking conductors to operate said gas-filled tube and said supervisory relay, means under the control of said supervisory relay for marking said trunk circuit busy, and means responsive to said connection of testing means with said switching equipment when said trunk circuit is in use to prevent the connection of said high potential to said talking conductors.

ALOYSIUS J. BUSCH.
OSCAR H. WILLIFORD.

REFERENCES CITED

The following references are of record in the file of this patent:

UNITED STATES PATENTS

| Number | Name | Date |
|---|---|---|
| 1,888,307 | Caswell | Nov. 22, 1932 |
| 1,968,435 | Bertels | July 31, 1934 |
| 2,301,837 | Wiley et al. | Nov. 10, 1942 |
| 2,327,458 | Relfe | Aug. 24, 1943 |
| 2,389,076 | Perry | Nov. 13, 1945 |